United States Patent
Tokura et al.

(10) Patent No.: US 7,548,333 B2
(45) Date of Patent: Jun. 16, 2009

(54) DATA TRANSFER METHOD AND IMAGE FORMATION SYSTEM

(75) Inventors: Yutaka Tokura, Irvine, CA (US); Kiyoshi Tokashiki, Kanagawa (JP); Masahiro Takayanagi, Gunma (JP); Yoshinori Ito, Tokyo (JP); Hitoshi Hoshino, Aichi (JP); Yuzo Harano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 10/606,899

(22) Filed: Jun. 27, 2003

(65) Prior Publication Data
US 2004/0125389 A1 Jul. 1, 2004

(30) Foreign Application Priority Data
Jul. 24, 2002 (JP) ............................. 2002-215354

(51) Int. Cl.
*G06F 15/00* (2006.01)
(52) U.S. Cl. .................. 358/1.15; 358/401; 347/43; 347/115; 347/117
(58) Field of Classification Search ............... 358/1.15, 358/401; 347/43, 115, 117
See application file for complete search history.

(56) References Cited

U.S. PATENT DOCUMENTS 6,108,017 A * 8/2000 Katakura et al. ............ 347/115

6,529,289 B1 3/2003 Konno et al. ............... 358/1.17

FOREIGN PATENT DOCUMENTS

| JP | 2000-242249 | 9/2000 |
| JP | 2001-100953 | 4/2001 |

OTHER PUBLICATIONS

Translation of Office Action dated Apr. 25, 2006, from Japanese counterpart application 2002-215354.

* cited by examiner

*Primary Examiner*—David K Moore
*Assistant Examiner*—Mark R Milia
(74) *Attorney, Agent, or Firm*—Fitzpatrick, Cella, Harper & Scinto

(57) ABSTRACT

The present invention aims to effectively perform image data transfer between an image generation controller and an image processing controller in either of color image printing and black-and-white image printing. Respective signal lines of Y, M, C and K are provided in a video interface formed between a PDL controller and the image processing controller. When the color image is printed by a printer of one-drum structure, data of a one color for four lines are simultaneously transferred by using the four signal lines, and this transfer operation is repeated for one page and for the four colors. When the black-and-white image is printed, black data for the four lines are simultaneously transferred by using the four signal lines, and this transfer operation is repeated for one page.

4 Claims, 9 Drawing Sheets

DATA TRANSFER METHOD AND IMAGE FORMATION SYSTEM

BACKGROUND OF THE INVENTION

1. Field of the Invention

The present invention relates to a data transfer method and an image formation system.

2. Related Background Art

Conventionally, an image processing system in which an image formation apparatus and an image reading apparatus are connected to an image processing controller having a command interface for transferring and receiving commands with a PDL (page-description language) controller and a video interface for transferring and receiving image data with the PDL controller is used.

In the PDL controller, PDL data received from a host computer connected thereto through a network or the like and described by a page-description language is first analyzed, and the analyzed data is expanded into raster image data. Then, a command sequence constructed based on the analyzed result is transferred to the image processing controller through the command interface, and thereafter the image data is transferred thereto through the video interface.

On one hand, in the image processing controller, an image formation unit is activated based on the command sequence and the image data both received from the PDL controller, an image represented by the received image data is formed on a recording sheet (paper), and the recording sheet on which the image has been formed is discharged outward.

Incidentally, an image formation unit (printer) which forms images of four colors, i.e., Y (yellow), M (magenta), C (cyan) and K (black), respectively on an image bearing body is equipped with one video data signal line. Thus, in a case where the image data of the four colors are transferred from an image generation controller unit to an image processing controller unit, the image data of each color completely occupies the video data signal line while this data is being transferred.

On one hand, an image formation unit (printer) which forms images of the four colors Y, M, C and K respectively on four image bearing bodies is equipped with four video data signal lines, whereby the image data of the four colors are simultaneously transferred from an image generation controller unit to an image processing controller unit. However, in this image formation unit, when only the data corresponding to the K image is transferred, this data is transferred by only one video data signal line in the same manner as above. That is, the remaining three video data signal lines are not used in this case.

However, in the above conventional image processing system, the number of the video data signal lines to be used when the image data are transferred between the image generation controller unit and the image processing controller unit is determined based on the number of the image bearing bodies provided in the image formation unit.

That is, the number of the video data signal lines and data transfer control between the image generation controller unit and the image processing controller unit must be changed according to the number of the image bearing bodies provided in the image formation unit.

Moreover, in the image processing system which is equipped with the four video data signal lines, even if the image data transferred from the image generation controller unit is only the data corresponding to the K image, only one video data signal line is used and the remaining three video data signal lines are not used, whereby the image data transfer is not effectively processed

SUMMARY OF THE INVENTION

The present invention has been completed in consideration of such conventional problems, and an object thereof is to enable to use all of provided four video data signal lines in case of transferring image data between an image generation controller unit and an image processing controller unit, so as to shorten a time necessary for such an image data transfer process and reduce a load on the image data transfer process by the image processing controller unit.

Under the above object, in order to solve the above problems, the present invention is characterized by a data transfer method in an image formation system which is equipped with an image generation controller unit for generating bitmap image data of an image, an image formation unit for forming an image on a recording medium (sheet), an image processing controller unit for controlling the image formation unit and also transferring image data at a timing requested by the image formation unit, and respective data signal lines for yellow, magenta, cyan and black to be used to transfer the image data between the image generation controller unit and the image processing controller unit, wherein in a case where the number of image bearing bodies of the image formation unit is one, when a color image signal is transferred from the image generation controller unit to the image processing controller unit, the image signals of one color component for the four lines are simultaneously transferred by using the yellow, magenta, cyan and black signal lines repeatedly until the transfer of the image signals for one page ends, and then the image signals of the next color component are transferred, and when a black-and-white image signal is transferred from the image generation controller unit to the image processing controller unit, the image signals of black color component for the four lines are simultaneously transferred by using the yellow, magenta, cyan and black signal lines repeatedly until the transfer of the image signals for one page ends.

Moreover, the present invention is characterized by an image formation system which is equipped with an image generation controller unit for generating bitmap image data of an image, an image formation unit including plural image bearing bodies of respective color components and for performing image formation by transferring on a recording medium images of the respective color components formed on the respective image bearing bodies, and an image processing controller unit for controlling the image formation unit and also transferring image data at a timing requested by the image formation unit, wherein plural video data signal lines of the respective color components are provided between the image generation controller unit and the image processing controller unit, and when the image data of only a single color is transferred from the image generation controller unit to the image processing controller unit, the image data for the plural lines are simultaneously transferred by simultaneously using the plural video data signal lines.

Moreover, the present invention is characterized by a data transfer method in an image formation system which is equipped with an image generation controller unit for generating bitmap image data of an image, an image formation unit for forming an image on a recording medium, an image processing controller unit for controlling the image formation unit and also transferring image data at a timing requested by the image formation unit, and respective data signal lines for yellow, magenta, cyan and black to be used to transfer the image data between the image generation controller unit and the image processing controller unit, wherein in a case where the number of image bearing bodies of the image formation unit is one, when a color image signal is transferred from the image generation controller unit to the image processing controller unit, the image signals of one color component for the four lines are simultaneously transferred by using the yellow, magenta, cyan and black signal lines repeatedly until the transfer of the image signals for one page ends, and then the image signals of the next color component are transferred, whereby the image signals of the four color components are transferred.

Other functions and features of the present invention will be apparent from the following description taken in conjunction with the accompanying drawings.

DETAILED DESCRIPTION OF THE PREFERRED EMBODIMENTS

Hereinafter, the embodiments of the present invention will be described in detail with reference to the accompanying drawings.

First Embodiment

Explanation of Image Processing System Structure

Figure 1:
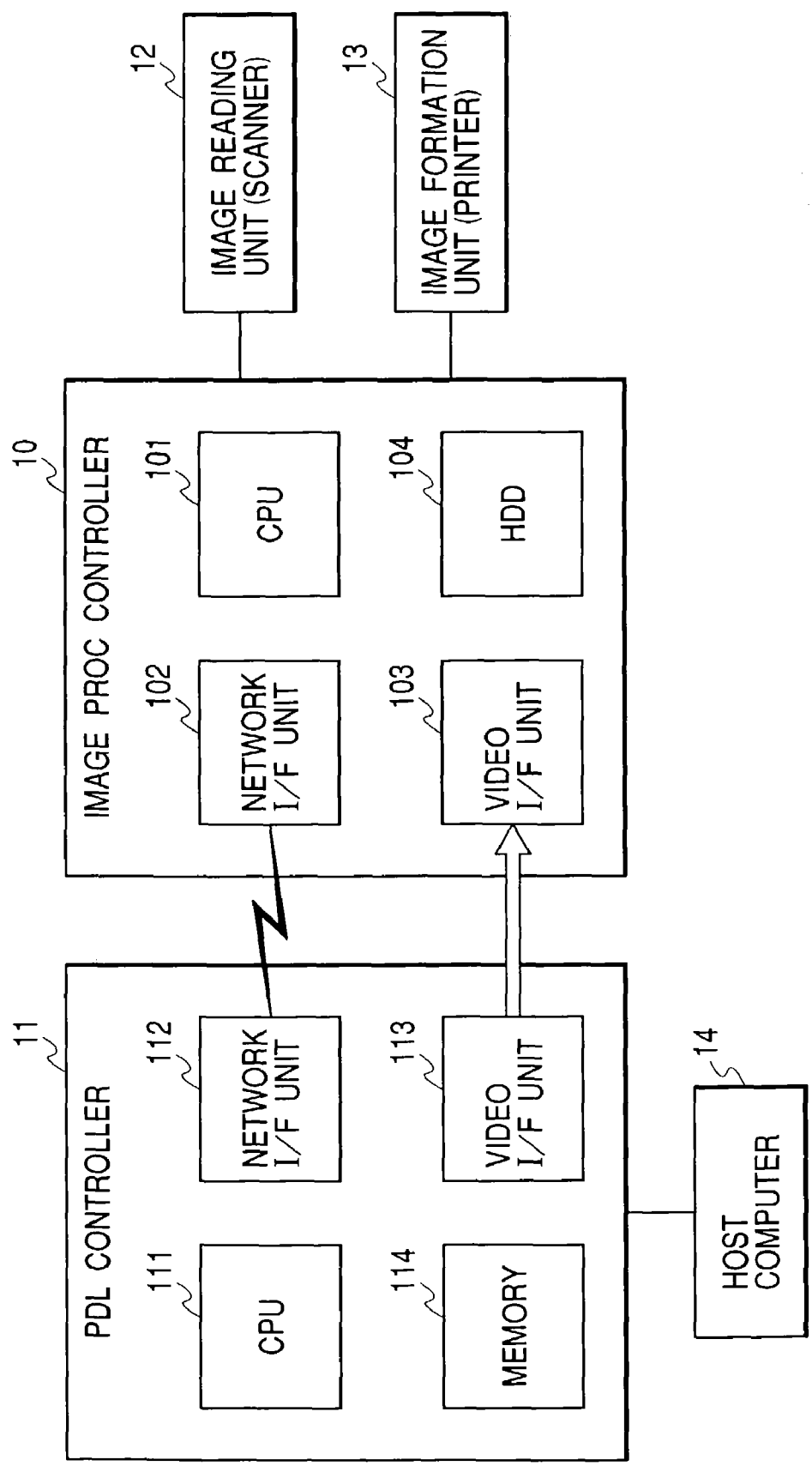
FIG. 1 is a block diagram showing the structure of an image processing system according to the present invention.

FIG. 1 is a block diagram showing an example of the image processing system according to the present embodiment.

An image processing controller 10 which is controlled by a CPU 101 includes an HDD (hard disk drive) 104, a not-shown memory and the like. Moreover, the image processing controller 10 includes a network I/F (interface) unit 102 and a video I/F unit 103, whereby a PDL controller 11 is connected to the image processing controller 10 through the network I/F unit 102 and the video I/F unit 103. In addition, an image reading unit (scanner) 12 and an image formation unit (printer) 13 are connected to the image processing controller 10 through a not-shown interface. Moreover, the image processing controller 10 includes a not-shown user interface unit having various keys and a liquid crystal display.

The interface for the image formation unit 13 and the image reading unit 12 is the dedicated interface which consists of control signal lines and video data signal lines. The video data signal line is the signal line for transmitting or receiving image data, and the control signal line is the signal line for transmitting a timing control signal for video data transmission/reception and various control instructions to the image reading unit or the image formation unit.

The image reading unit 12 which includes a CCD reads an image of an original set on an original mounting board, generates raster image electronic data based on the read image, and transfers the generated data to the image processing controller 10. Moreover, when the structure is appropriately modified, the image reading unit 12 can include an ADF (automatic document feeder) for continuously reading images on an original including plural pages.

The image formation unit 13 which includes a print engine such as a laser beam printer forms an image of the image data from the image processing controller 10 on a recording sheet, and outputs the sheet on which the image has been formed outward. Moreover, when the structure is appropriately modified, the image formation unit 13 can include plural sheet feed stages for appropriately selecting and feeding plural recording sheets of different sizes and different kinds on which the images should be formed. Moreover, when the structure is appropriately modified, the image formation unit 13 can include a predetermined finishing device for sorting the plural output recording sheets and performing saddle-stitch bookbinding of a booklet type for the sorted recording sheets.

The image processing controller 10 can compress the received image data, store the image data in the HDD 104, rotate the image of the image data in a desired direction, and enlarge or reduce the image of the image data into a desired size. Moreover, the image processing controller 10 can perform a color adjustment process such as smoothing, calibration or the like. In this connection, a not-shown memory which is provided in the image processing controller 10 is used as a working area for performing such processes. These processes are performed as software processes by the CPU 101 mainly based on programs previously stored in a not-shown ROM or the HDD 104. On one hand, to increase a processing speed, a part of the image process can be performed as a hardware process by as a hardware-structured image processing unit. Moreover, the image processing controller 10 includes the video I/F unit 103 for receiving the raster image data from the PDL controller 11 and the network I/F unit 102 for transmitting and receiving various commands and status data.

The PDL controller 11 includes a not-shown external interface which is controlled based on a program operating on a CPU 111, and thus receives a print job described by a page description language (PDL) from a host computer 14 or the like through the external interface. Subsequently, the PDL controller 11 constructs a print job sequence based on the received PDL job, expands the image data according to the print job sequence, and then actually starts the print job. Moreover, the PDL controller 11 can perform a scan job to, in response to an instruction from the host computer 14 or the like, transfer an original reading instruction to the image processing controller 10 and then transfer the image data from the image processing controller 10 to the host computer 14 or the like. A network I/F unit 112 is the interface for mainly transmitting and receiving various commands and status data with the image processing controller 10, and a video I/F unit 113 is the interface for transferring the image data to be printed to the image processing controller 10. Incidentally, a memory 114 is used as a working area for program operations, and also as a frame buffer for temporarily storing expanded image data. In addition, the PDL controller 11 includes a not-shown hard disk drive for storing an OS, programs, job data and the expanded image data.

(Explanation of Image Formation Unit Structure Having One Image Bearing Body)

Figure 2:
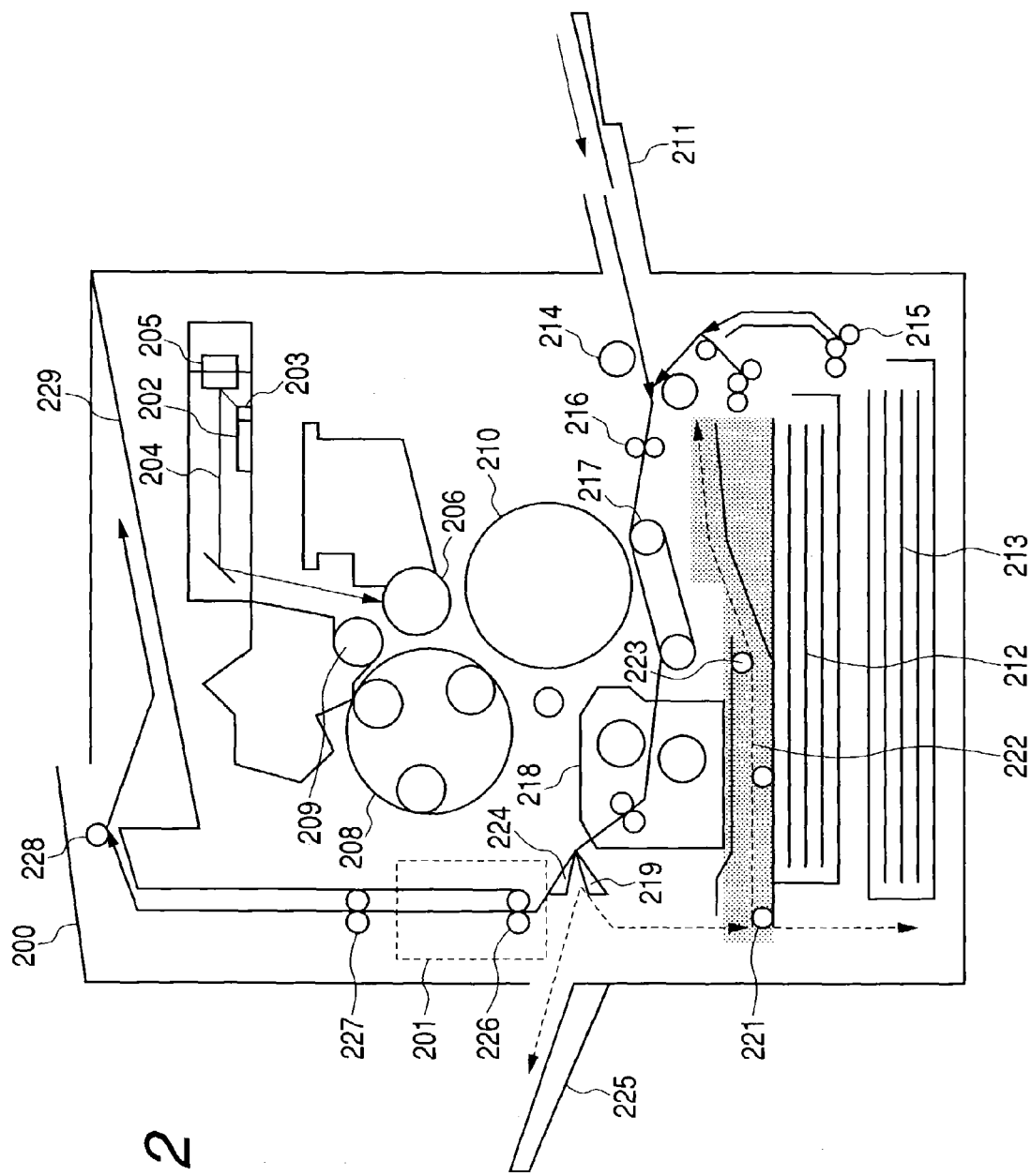
FIG. 2 is a cross-sectional diagram showing the structure of an image formation unit having one image bearing body.

FIG. 2 is a cross-sectional diagram showing the structure of the image formation unit which has one image bearing body. Here, it should be noted that this unit is applicable to the image formation unit 13 shown in FIG. 1.

In the present embodiment, the laser beam printer is used as the image formation unit.

As shown in FIG. 2, a laser beam printer 200 includes an image processing controller 201 which controls the printer as a whole and also controls the image data supplied from the image processing controller 10.

The image formation unit 13 receives image data from the image processing controller 201 and then outputs the received image data as a video signal to a laser driver 202.

The laser driver 202 consists of a circuit for driving a semiconductor laser 203, and this circuit performs on/off switching for a laser beam 204 to be generated from the semiconductor laser 203.

The laser beam 204 is swung rightward and leftward by a rotative polygonal mirror 205, and thus scanned and exposed on a photosensitive drum 206 acting as the image bearing body. By the scanning and exposing, an electrostatic latent image capable of representing a character pattern, an image and the like is formed on the photosensitive drum 206. Then, the electrostatic latent image is visualized as developer images respectively by a developing unit (including Y, M and C developing units) 208 and a developing unit (including a K developing unit) 209 both disposed around the photosensitive drum 206, the developer images are superposed together and transferred onto an intermediate transfer drum 210, and the image on the drum is then transferred to a predetermined face of a recording sheet.

When a color image is printed, yellow data is first scanned and exposed to form an electrostatic latent image corresponding to the yellow data on the photosensitive drum 206, a yellow image is visualized as a developer image on the photosensitive drum 206 by the rotation of the developing unit 208, and the visualized yellow image is then transferred to the intermediate transfer drum 210. After the transfer of the yellow image ended, the developing unit 208 is rotated, and a magenta image is visualized and transferred to the intermediate transfer drum 210 as well as the yellow image. Subsequently, after the transfer of the magenta image ended, a cyan image is visualized and transferred to the intermediate transfer drum 210 according to the same sequence as above. After such developing operations ended, the developing unit 208 is rotated.

At that time, in preparation for a developing operation of a black image, a developing element for each color in the developing unit 208 is stopped at the position not opposite to the photosensitive drum 206. At the last, the black image is visualized and transferred to the intermediate transfer drum 210.

Thus, the respective color images are visualized and transferred sequentially, that is, the similar developing operation is repeatedly performed four times, whereby the images of the four colors are borne on the intermediate transfer drum 210 and thus the color image is wholly formed.

When a black-and-white image is printed, only the black image is visualized and transferred to the intermediate transfer drum 210, whereby the image is formed on the intermediate transfer drum 210 by performing the developing operation only once.

A cut sheet is used as the recording sheet (paper), and such recording sheets are held in a manual feed tray 211, an upper-stage sheet feed cassette 212 and a lower-stage sheet feed cassette 213 which are all mounted on the laser beam printer 200. The recording sheet in the manual feed tray 211 is fed into the laser beam printer 200 by a sheet feed roller 214, and the recording sheets in the sheet feed cassettes 212 and 213 are fed into the laser beam printer 200 by a sheet feed roller 215. Then, the fed recording sheet is transported up to the intermediate transfer drum 210 through a sheet feed path provided by a transportation roller 216 and a transfer belt 217 so that one face of the recording sheet is opposite to the intermediate transfer drum 210.

After then, the recording sheet on which the image has been transferred is transported to a fixing unit 218, and the image is fixed to the recording sheet by the fixing unit 218. Subsequently, the recording sheet on which the image has been fixed is transported to a sheet discharge path or to a face change path 222 through a face changer 219. Here, it should be noted that the face change path 222 is the path which is used to reverse the face of the recording sheet on which the image is to be formed.

More specifically, in the face change path 222, the recording sheet of which the one face the image has been fixed on is transported to the intermediate transfer drum 210 through transportation rollers 221, 223 and 216 when a two-faced print mode has been set. After the recording sheet was once transported from the face changer 219 to the transportation roller 221, the recording sheet is again transported by the transportation rollers 221 and 223 to the intermediate transfer drum 210, whereby the face of the recording sheet opposite to the intermediate transfer drum 210 is changed from one face to the other face.

On one hand, in the sheet discharge path, the destination to which the recording sheet is discharged is changed to a faceup sheet discharge tray 225 or to a facedown sheet discharge tray 229 through a sheet discharge destination changer 224. Here, transportation rollers 226, 227 and 228 are the rollers for transporting the recording sheet to the facedown sheet discharge tray 229.

(Explanation of Interface Between Printer and Image Processing Controller)

In the present embodiment, the image formation unit 13 can receive as input images a color multivalued image signal and a black-and-white binary image signal. Moreover, the image formation unit 13 can receive a tag signal (TAG) in regard to each pixel.

In case of receiving the color multivalued image signal, the image formation unit 13 receives the eight-bit signal for each of Y, M, C and K in regard to each pixel, and a clock at that time is set so that an image of resolution 600 dpi can be formed according to an image formation speed. That is, when the color multivalued image signal is received, the image of 600 dpi is basically formed. However, when the tag signal (TAG) is added to the specific pixel, the neighboring two pixels are handled as a set of pixels and its resolution is reduced to 300 dpi, whereby an image of which the tonality increases can be formed. That is, the tag signal (TAG) is used as the signal representing a photograph image area to discriminate it from a character image area, whereby excellent image formation suitable for each area can be achieved. Incidentally, total five signal lines including four lines each corresponding to an eight-bit signal (Y, M, C and K) and one line corresponding to a two-bit signal (TAG) are provided as the signal lines. Of course, other control signal lines are provided. Although these signal lines are arranged in parallel, plural signal lines (5+α) can be virtually achieved with use of a high-speed serial line by the drivers of the both-side apparatuses.

On the contrary, in case of receiving the black-and-white binary image signal, a one-bit signal is received in regard to each pixel. A clock at that time is set so that an image of resolution 1200 dpi can be formed. Incidentally, since the black-and-white binary image signal is handled, a process such as a dither process or the like to give tonality in a photograph area has been already performed in a superordinate apparatus such as the image processing controller 10 or the PDL controller 11, whereby it is unnecessary to change the process even if a tag bit (TAG) exists. Moreover, it is unnecessary to provide a dedicated hardware signal line for the black-and-white binary image signal, that is, it is possible to user the signal line also used in case of receiving the color multivalued image signal. For example, in a black-and-white binary mode, it is possible to use the one-bit tag signal (TAG) line as the image signal line and achieve a double-speed clock (quad-speed clock if including sub scan). Moreover, it is possible to use the total four bits (including the least significant one bit for each of Y, M, C and K) as maintaining the clock of 600 dpi, and obtain such data as image information of the clock of 1200 dpi on the driver side.

In addition, for example, it is of course possible to achieve a black-and-white multivalued (8 bits×1 color) mode. In this case, only the signal line for K may be used from among the signal lines for Y, M, C and K, together with the tag bit (TAG).

(Explanation of Interface Between PDL Controller and Image Processing Controller)

In the present embodiment, a first interface between the PDL controller 11 and the image processing controller 10 is the network interface which uses Ethernet™. Here, the first interface is mainly used to transfer and receive commands (e.g., a print instruction, a mode instruction, etc.) and status information representing the statuses (e.g., whether the image formation unit 13 is in a ready state, whether the image reading unit 12 is in a ready state, whether an error has occurred, etc.) between the PDL controller 11 and the image processing controller 10. In this case, it is of course possible to use, instead of Ethernet™, a serial cable such as an RS232C cable, a USB cable or an IEEE1394 cable, or a parallel cable such as a Centronics™ interface.

Figure 3:
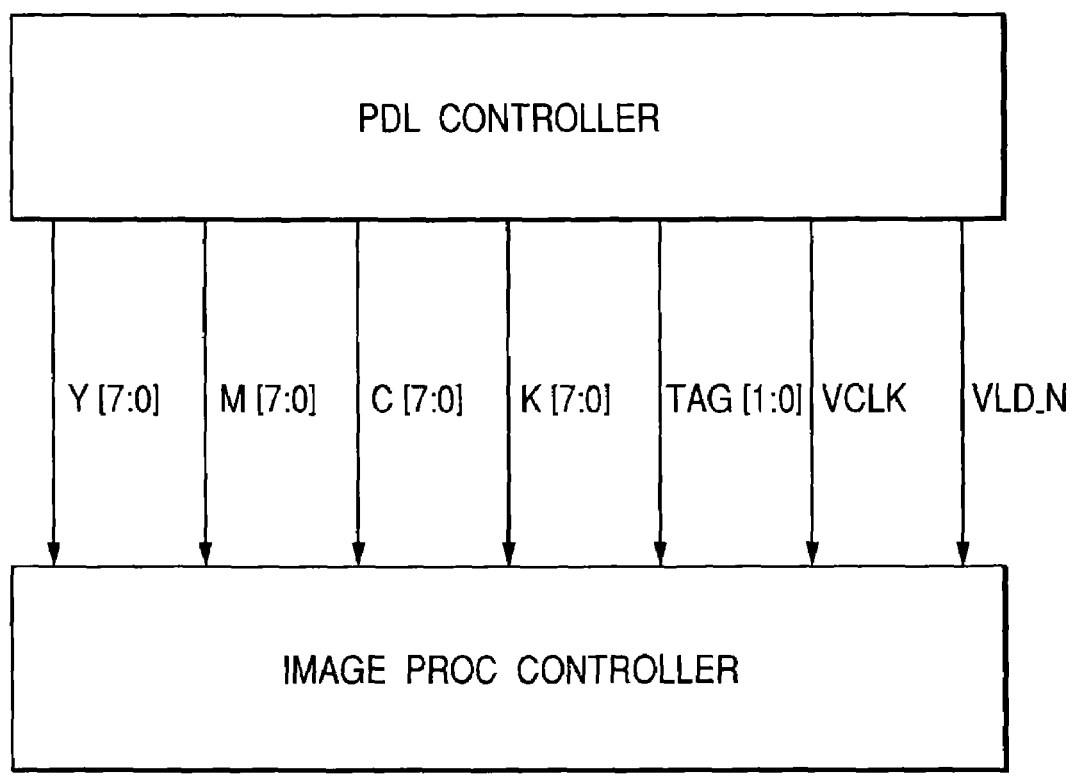
FIG. 3 is a block diagram showing the structure of a video interface.

A second interface is the video interface which is used to transfer image data, as shown in FIG. 3. The second interface is structured so that eight-bit image signals of Y, M, C and K, a two-bit tag bit signal (TAG) indicating the property of the image area, a pixel clock (VCLK) indicating a pixel unit of a signal, and a signal (VLD_N) such as a line enable signal or the like indicating a breakpoint of each line are logically transferred in parallel.

The network interface is a general-purpose Ethernet™ interface of relatively low speed by which an information amount capable of being transferred at a time is relatively small. However, since a general-purpose protocol such as TCP/IP or the like is used, the network interface can achieve a multichannel operation of processing plural kinds of information at a time by providing plural addresses and ports. In the system of the present embodiment, the network interface contains plural ports according to various purposes such as a print port, an administration port, an event port and the like which are disposed in parallel as separate channels.

On the other hand, since the video interface is designed as a dedicated interface in consideration of a system performance, the video interface can achieve sufficient high-speed data transfer. Incidentally, the video interface can transfer the four kinds (Y, M, C, K) of image data at a time.

(Explanation of Print Operation Flow)

Figure 4:
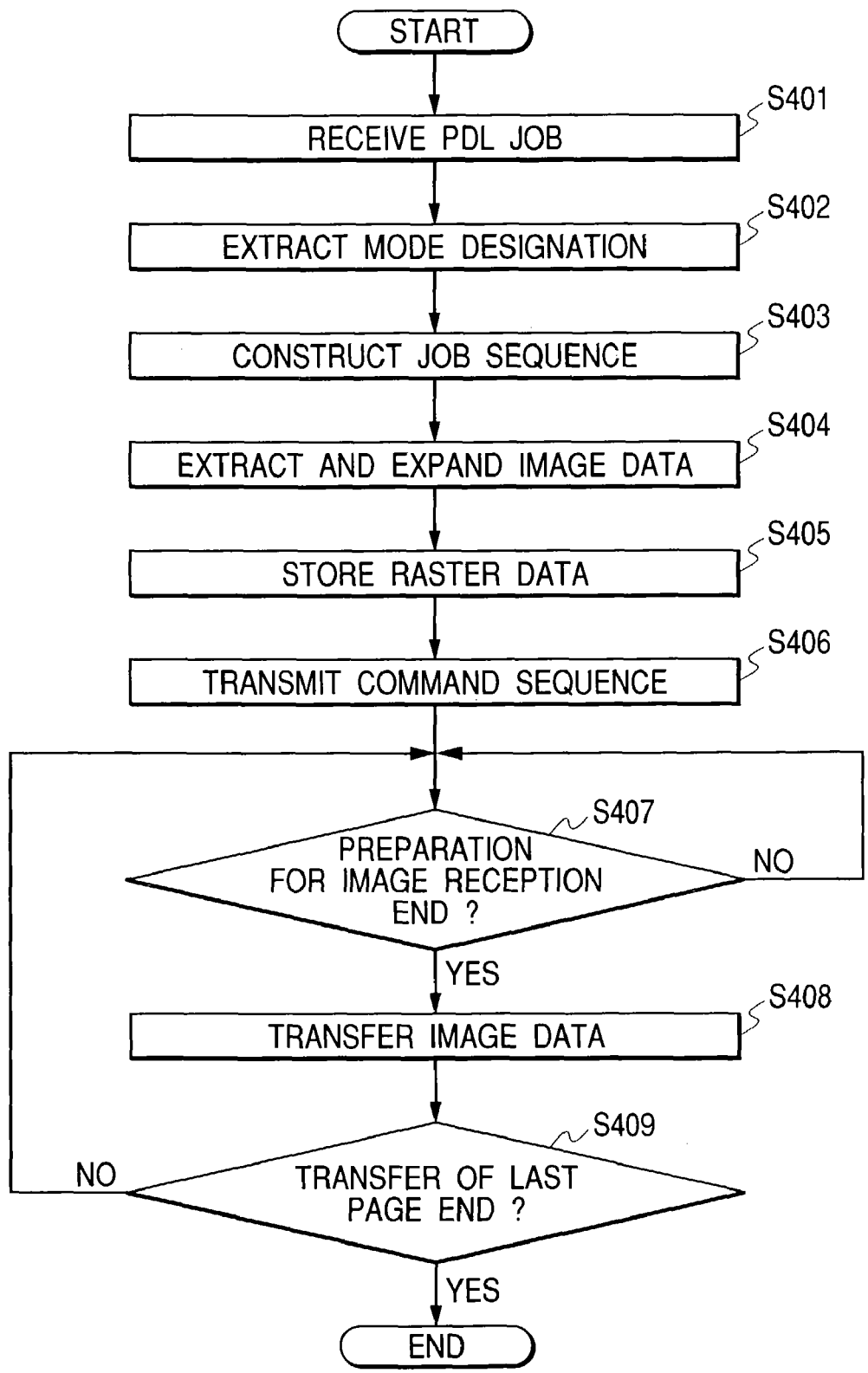
FIG. 4 is a flow chart showing an example of a process of a print operation by a PDL controller according to the first embodiment of the present invention.

FIG. 4 is a flow chart showing the print operation by the PDL controller 11.

First, the PDL controller 11 receives a print job from the host computer 14 through the network interface or a not-shown external interface such as a USB, an IEEE1394 bus or the like (S401). Here, the print job is a so-called PDL job which is described by a page-description language such as PS (PostScript), PCL (Printer Control Language), LIPS (LBP Image Processing System) or the like, and created by an application program operating on the host computer 14 or the like through a printer driver. That is, the PDL job includes information (mode designation information) necessary to construct a print job sequence requested by each page and also includes PDL-type image data of for each page. Here, the mode designation information includes sheet size information, sheet medium information, designation information indicating one-faced print or two-faced print, color mode information, finishing information and the like.

Then, the PDL controller 11 extracts mode designation from the received PDL job (S402), analyzes the extracted mode designation, and constructs the print job sequence (S403). For example, the PDL controller 11 determines how many sheets should be transported from which sheet feed stage, which sheet discharge stage the print-processed sheets should be discharged, when the sheet feed stage should be changed in midstream at the time how many sheets have been print-processed, in any processes of a finishing process, a one-faced print process and a two-faced print process.

Besides, the PDL controller 11 fetches the portion corresponding to the image data from the PDL job, and expands the fetched image data into a raster image data (bitmap image data) on a frame buffer area of the memory (S404). The expanded data is once compressed and stored in the memory or the HDD (S405). Such a series of processes is performed to all the pages included in the job.

Then, the PDL controller 11 notifies the image processing controller 10 of the structured job sequence in the form of command sequence of achieving it through the print port (S406). The image processing controller 10 prepares image data reception by the video interface on the basis of the received job sequence. When the preparation ends, the image processing controller 10 notifies, through the print port, the PDL controller 11 that the preparation for the image data reception has ended.

When it is confirmed that the preparation for the image data reception has ended on the side of the image processing controller 10 (S407), the PDL controller 11 transfers the image data to the image processing controller 10 in synchronism with control signals such as an image clock, a line enable signal and the like (S408). Here, the process in the step S407 is repeated until the end of the preparation is confirmed.

An image data transfer process is performed in regard to one page, whereby transfer start and end commands are transferred and received at the print port in units of page. When the process of the image processing controller 11 does not catch up with a transfer speed for some reason, the image processing controller 10 notifies the PDL controller 11 of a failure of the image data reception and requests the PDL controller 11 to retransfer the image data.

Then, it is confirmed that the images of all the pages have been transferred by confirming the end of the transfer of the last page (S409), the print process of the PDL controller 11 ends. On the contrary, when it is not confirmed in the step S409 that the images of all the pages have been transferred, the flow returns to the step S407.

Incidentally, in FIG. 4, at the time when the image data expansion process in the step S404 and the raster data storage process in the step S405 for one page or more end, the command sequence transmission process in the step S406 is performed. In this case, it is possible to perform the image data expansion process (S404) and the image data transfer process (S408) in the intervals of the command transmission while the command sequence transmission process is being performed.

The image data transferred from the PDL controller 11 to the image processing controller 10 is once stored in the HDD 104 or the not-shown memory. At this time, according to the setting of the various modes such as the finishing and the like in the previously transferred print sequence, it is determined whether to wait for the data reception for all the pages or to activate the image formation unit at the time when the data reception for one page ore more ends.

When the image forming unit is activated, the various modes including the sheet feed stage, the two-faced print, the finishing and the like are designated based on the job sequence transferred from the PDL controller 11, and page information concerning the image data is disposed in an internal queue on the not-shown memory in order of page requested by the image formation unit. At this time, at least the image data to be first transferred has been expanded in the frame buffer on the memory, and the remaining image data stored in the HDD 104 are sequentially transferred from the HDD 104 as soon as the frame buffer becomes vacant.

Then, the image data are transferred to the image formation unit 13 in order of page information included in the queue, in synchronism with a signal indicating the leading edge of the image transferred from the image formation unit 13. Subsequently, the image formation unit 13 forms the image according to the transferred image data of each page on the recording sheet transported from the designated sheet feed stage, performs the designated finishing process to the image-formed recording sheets, and then discharges the finishing-processed sheet outward.

(Raster Data Generated by PDL Controller)

The PDL controller 11 in the present embodiment can generate the two kinds of raster data respectively indicating a color multivalued image and a black-and-white binary image. Here, the kind of image to be generated is based on the designation issued from the driver on the host computer. However, when the kind of image is not designated, it is based on default setting which has been previously designated by the PDL controller 11.

When the original PDL data to be expanded is black-and-white multivalued image data, or when the original PDL data to be expanded is color multivalued image data but the black-and-white binary mode has been designated by the driver, the expanded black-and-white multivalued image data is converted into the black-and-white binary image data. At that time, the multivalued image data is converted into the binary image data in a dither method or the like. Besides, in the present embodiment, since the black-and-white binary image data is expanded at 1200 dpi, a character area or a graphic area is subjected to a smoothing process to increase the resolution from 600 dpi to 1200 dpi, thereby smoothing the edge or the like of the area.

When the developing operation is performed, it is possible based on the description by the PDL to discriminate whether a specific area in the image is a character/graphic image or an original bitmap image such as a photograph image. The image processing controller 10 stores the above information as area information when the image data is expanded into the raster image data. Thus, the stored information can be used to perform the smoothing process in case of processing the above black-and-white binary image signal and also to generate the tag signal (TAG) for the image processing controller 10.

(Image Transfer in Case of Black-and-White Binary Image Signal)

When the image data to be transferred from the PDL controller 11 to the image processing controller 10 is the color multivalued image data, the image data amount for one page is equivalent to the number of pixels for (8×4 (Y, M, C, K)+2 (TAG)) bits×1 page. However, when the image data to be transferred from the PDL controller 11 to the image processing controller 10 is the black-and-white binary image data, the image data amount is equivalent to the number of pixels for 1 bit×1 page. In the present embodiment, the color multivalued image data has the data amount of 600 dpi and the black-and-white binary image data has the data amount of 120 dpi, whereby the data amount becomes about ⅛ or less.

The PDL controller in the present embodiment can process PS (PostScript) data as the PDL data, but can of course process other plural kinds of PDL data such as PCL (Printer Control Language) data, PDF (Portable Document Format) data, LIPS (LBP Image Processing System) data and the like.

Moreover, a user can designate desired image quality by a driver (PPD (PostScript Printer Driver)). Therefore, according to the designation, the PDL controller can adjust a data compression ratio of the image data to be temporarily stored in the hard disk, thereby adjusting a degree of image quality deterioration.

In addition, the user can designate by the driver whether to perform color print or black-and-white print.

Figure 5:
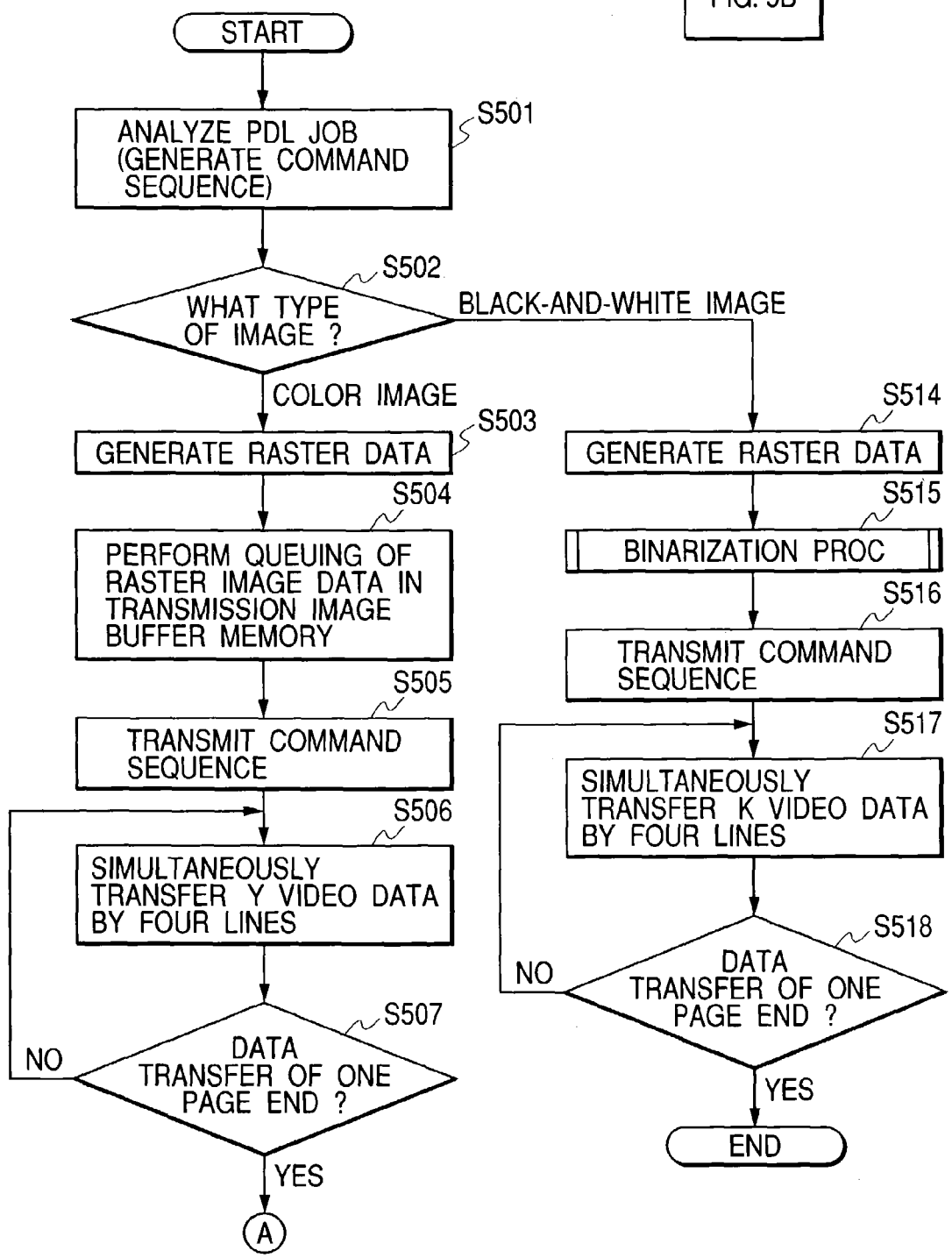
FIG. 5 which is composed of FIGS. 5A and 5B is a flow chart showing an example of a video data transfer process.
Figure 5B:
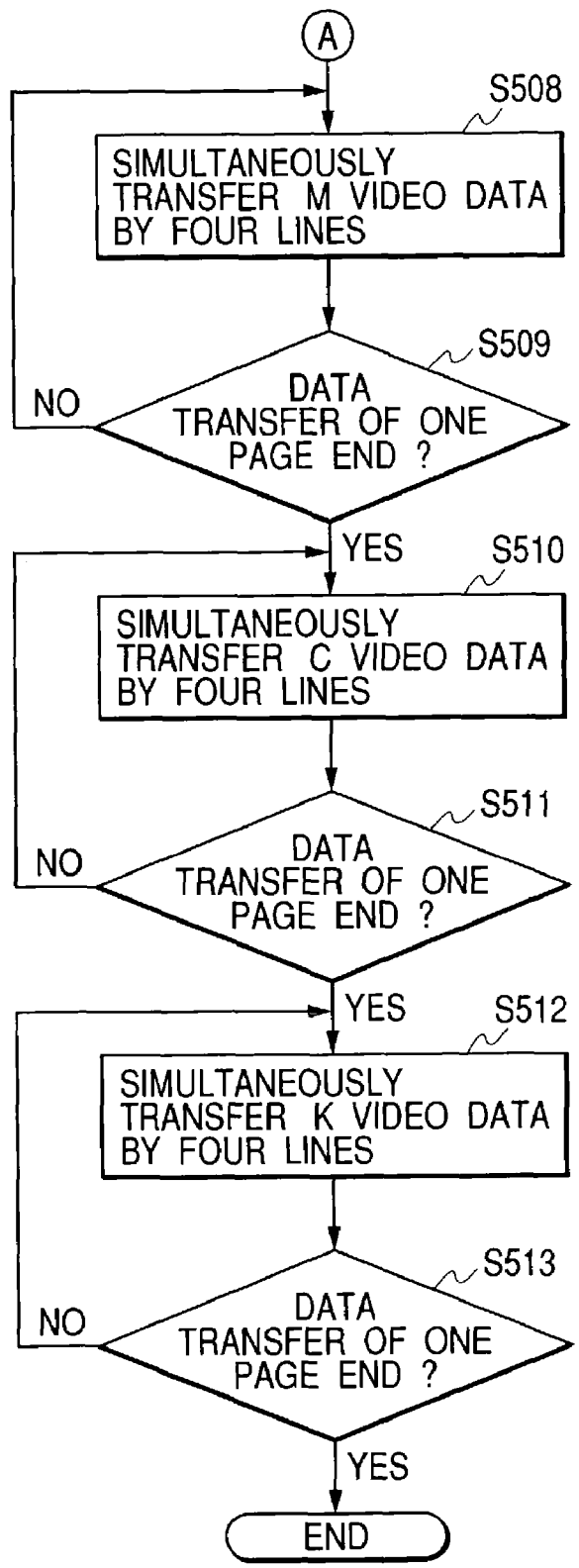

FIG. 5 which is composed of FIGS. 5A and 5B is a flow chart showing the process in the PDL controller 11.

In this process, it is controlled to change the video data signal line to be used to transfer the image data to the image processing controller 10, according to whether the raster image data expanded by the PDL controller 11 is the color multivalued image data or the black-and-white binary image data. Hereinafter, the process will be explained in detail with reference to the flow chart shown in FIGS. 5A and 5B.

First, the PDL controller 11 receives the PDL job from the host computer and analyzes the received PDL data (S501). Then, the PDL controller 11 extracts the portion concerning job operation designation such as job mode designation (e.g., two-faced print, finishing, etc.), sheet size and medium designation of each page, and the like, and generates a command sequence of this print job.

Next, the PDL controller 11 discriminates a type (i.e., color or black-and-white) of the image in this job (S502).

If the discriminated type of the image is the color image, the PDL image description portion is analyzed, and eight-bit color multivalued raster data of each of Y, M, C and K is generated on the frame buffer (S503).

Then, a process to queue the raster image data in the transmission image buffer memory is performed (S504). At that time, when the buffer memory has a sufficient capacity, the image data themselves can be queued in order of pages to be transmitted. However, it is typically difficult to mount the memory of such a capacity due to increase in cost. Therefore, the object to be actually queued is a label in regard to the raster data of each page, and the raster data itself is correlated with the label, subjected to a JPEG (Joint Photographic Experts Group) compression process, and then stored in the hard disk. Typically, since a page number (ID) is uniquely determined in the job, it is possible to allocate a uniquely determined job ID to the generated print job and thus treat a set of the job ID and the page ID as the label for the raster data.

After the image data expansion ended, the command sequence is transmitted (S505). Subsequently, the image processing controller 10 which received the command sequence starts preparing the image reception and then notifies the PDL controller 11 of the end of the preparation for the image reception.

After then, Y raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S506). Then, it is discriminated whether or not the transfer of the Y raster image data for one page ends (S507). If it is discriminated that the transfer does not end, the flow returns to the step S506 to simultaneously transfer the Y raster image data for next four lines. Such a process is repeated until the transfer of the Y raster image data for one page ends.

After the transfer of the Y raster image data for one page ended, then M raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S508). Then, it is discriminated whether or not the transfer of the M raster image data for one page ends (S509). If it is discriminated that the transfer does not end, the flow returns to the step S508 to simultaneously transfer the M raster image data for next four lines. Such a process is repeated until the transfer of the M raster image data for one page ends.

After the transfer of the M raster image data for one page ended, then C raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S510). Then, it is discriminated whether or not the transfer of the C raster image data for one page ends (S511). If it is discriminated that the transfer does not end, the flow returns to the step S510 to simultaneously transfer the C raster image data for next four lines. Such a process is repeated until the transfer of the C raster image data for one page ends.

After the transfer of the C raster image data for one page ended, then K raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S512). Then, it is discriminated whether or not the transfer of the K raster image data for one page ends (S513). If it is discriminated that the transfer does not end, the flow returns to the step S512 to simultaneously transfer the K raster image data for next four lines. Such a process is repeated until the transfer of the K raster image data for one page ends.

When the raster image data are transferred, timing commands indicating start timing and end timing of each page are transferred by a print port separately.

Typically, since the job includes plural pages, the raster expansion process and the queuing process in the steps S503 and S504 to be performed to each page are repeated until all the pages are processed. After then, the command sequence transmission process in the step S505 is performed. On one hand, it is also possible to prepare another port for transmitting the commands indicating the start timing and the end timing of the image data transfer, transmit the command sequence to the image processing controller 10 immediately after the command sequence was generated in the step S501, and then transmit the video data for each page to the image processing controller 10 as generating the raster image data. By doing so, the image processing controller 10 can know beforehand what kind of image is transmitted from the PDL controller 11, whereby there is an advantage that the image processing controller 10 can immediately prepare for video data reception.

Incidentally, if the type of the image discriminated in the step S502 is the black-and-white job (image), then raster data is generated (S514). In this case, for example, if a user designates black-and-white output in regard to the original color multivalued image data, the generated image data is the black-and-white multivalued image data.

If the generated raster image data is the black-and-white multivalued image data, the generated data is subjected to a binarization process (S515). The binarization process is shown in detail by a flow chart of FIG. 6.

Figure 6:
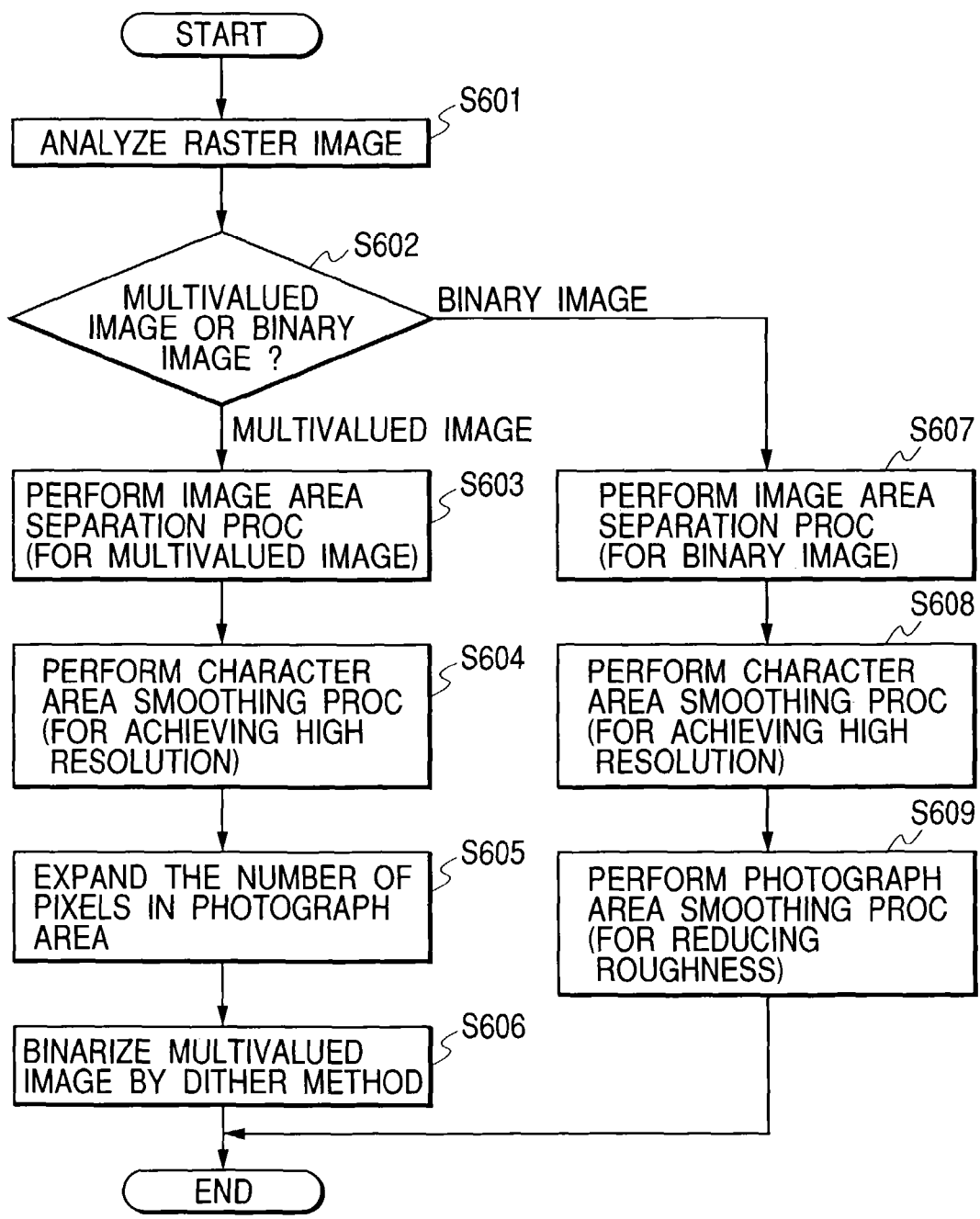
FIG. 6 is a flow chart showing an example of a process to binarize a black-and-white image.

In FIG. 6, the raster image data is analyzed (S601), and it is discriminated whether the analyzed image data is the multivalued image data or the binary image data (S602).

If it is discriminated that the image data is the multivalued image data, an image area separation process is performed to the multivalued image data (S603). In the image area separation process, the tag bit information (TAG) previously stored when the PDL data was expanded and indicating each property of the image area is used, whereby a character area and a photograph area are separated from each other according to a tonality change state in the bitmap area.

Then, the smoothing process is performed to the character area (S604). In the smoothing process, for example, a pattern matching process is performed to an area of 8×8 pixels to enlarge it to 16×16 pixels, and the edge portion of the enlarged area is smoothened. That is, the raster image is enlarged from 600 dpi to 1200 dpi in the smoothing process. Of course, a gray halftone character (i.e., not a black character) is smoothened with tonality maintained.

In the area discriminated as the photograph area, the number of pixels is expanded by simply expanding one pixel to four pixels without changing the tonality (S605). Thus, the multivalued image area of 1200 dpi can be obtained for the entire image area.

After then, the dither process is performed to convert the multivalued image into the binary image (S606). In this case, when the photograph image is binarized, its high-frequency component is eliminated, and its tonality somewhat decreases, whereby roughness due to the area enlargement from one pixel to four pixels is absorbed and thus obscured. By representing the tone (gradation) in binary of 1200 dpi, excellent tonality can be obtained as compared with the case where the image data is binarized as maintaining 600 dpi.

Then, when the expanded image is essentially the binary image of 600 dpi, the area separation process for the binary image data is performed by only using the above tag bit information (TAG) (S607).

Besides, as well as the step S604, the smoothing process is performed to the character area (S608).

Since the photograph area is essentially the binary dither image of 600 dpi, its roughness is reduced by enlarging this area to 1200 dpi (S609). More specifically, an average density of a narrow range in some degree such as the 5×5 pixels of the original image is calculated, and the density (multivalued data) of its central pixel is determined as the average density. In this case, since the obtained image is somewhat obscure as it is, filtering for edge emphasis is performed, the number of pixels of the image is then expanded as well as the steps S604 and S605, and the binarized image of 1200 dpi is thus obtained by the dither process.

By the above processes, from either the multivalued black-and-white image data of 600 dpi or the binary black-and-white image data of 600 dpi, the satisfactory binary black-and-white raster image data of 1200 dpi can be obtained.

Subsequently, after the image data expansion ended, the command sequence is transmitted (S516). Then, the image processing controller 10 which received the command sequence starts preparing the image reception and then notifies the PDL controller 11 of the end of the preparation for the image reception.

After then, the K raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S517).

Subsequently, it is discriminated whether or not the transfer of the K raster image data for one page ends (S518). If it is discriminated that the transfer does not end, the flow returns to the step S517 to simultaneously transfer the K raster image data for next four lines. Such a process is repeated until the transfer of the K raster image data for one page ends.

Here, it should be noted that the flow chart of FIGS. 5A and 5B merely shows an example. That is, according to the PDL structure, the color/black-and-white discrimination can be of course performed after the image expansion ended.

In the process of the color multivalued image data, the PDL controller 11 can immediately start analyzing next PDL data by storing in the queue all the raster images of the job in question and entrusting the image transmission to another program operating in parallel. However, if the next PDL job data is again the color multivalued image data, the end of the job transfer is eventually influenced by the end of the video data transfer.

According to the present embodiment, in the case where the print engine equipped with the one image bearing body is used, the four video data signal lines are provided and always used irrespective of the kind of color, whereby a video data transfer time can be shortened, and the PDL controller can immediately start analyzing the next PDL job. Moreover, it is unnecessary to prepare the dedicated video interface for the print engine equipped with the one image bearing body, whereby the video interface for the print engine equipped with the four image bearing bodies can be used also as the video interface for the print engine equipped with the one image bearing body.

Besides, in the explanation of the present embodiment, the color image job is separated from the black-and-white image job. However, the present embodiment is of course applicable to a case where color and black-and-white images mixedly exist in one page. In this case, the path through which the image data are transferred may be changed in regard to each page.

Second Embodiment

In the present embodiment, the structure of an image processing system is the same as that shown in FIG. 1.

Besides, the structure of an interface between a PDL controller 11 and an image processing controller 10 is the same as that shown in FIG. 3.

(Explanation of Image Formation Unit Structure Having Four Image Bearing Bodies)

Figure 7:
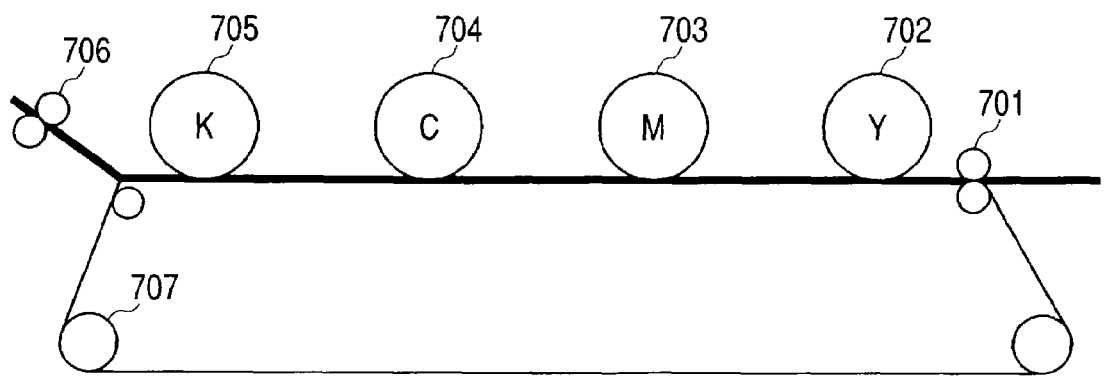
FIG. 7 is a vertical cross-sectional diagram showing the structure of an image formation unit having four image bearing bodies.

FIG. 7 is a vertical cross-sectional diagram showing the structure of an image transfer unit of the image formation unit which has the four image bearing bodies.

In the present embodiment, a laser beam printer is used as the image formation unit. That is, in response to image data supplied from an externally connected image generation controller unit, an image processing controller unit forms an image on a recording sheet being a recording material.

Besides, a yellow (Y) developing drum unit 702, a magenta (M) developing drum unit 703, a cyan (C) developing drum unit 704 and a black (K) developing drum unit 705 are disposed in series at a predetermined interval, whereby developer images of respective colors are visualized and sequentially transferred to the recording sheet.

A cut sheet used as the recording sheet is transported from a sheet feed cassette (not shown) to the developing drum unit through a pair of transportation rollers 701 and a transportation roller 707. After then, the recording sheet is discharged outward by a pair of sheet discharge rollers 706.

Figure 8:
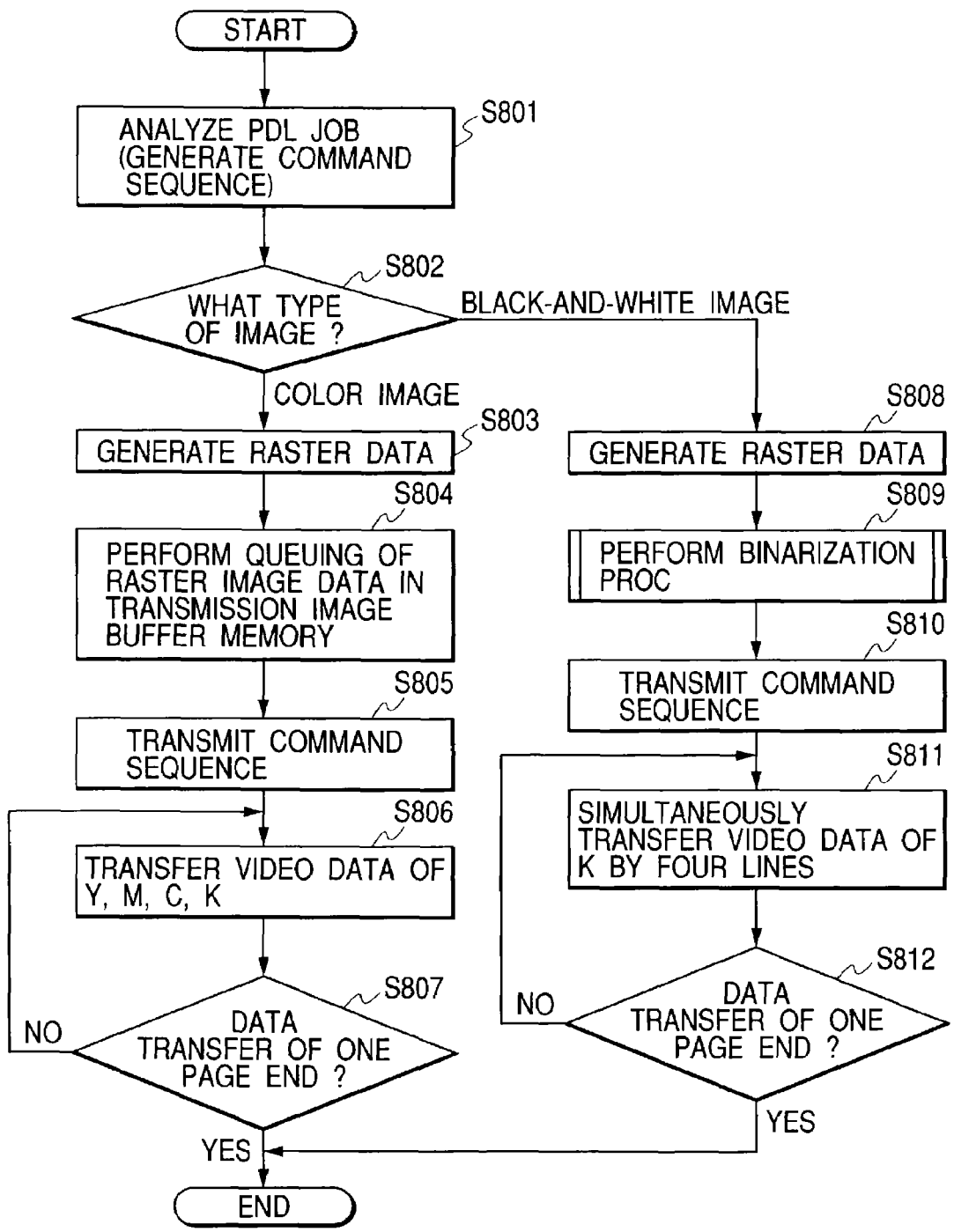
FIG. 8 is a flow chart showing an example of a process of a print operation by a PDL controller according to the second embodiment of the present invention.

FIG. 8 is a flow chart showing an example of a process in the PDL controller 11 according to the present embodiment.

In the process, video data signal line control for transferring image data to the image processing controller 10 is changed between a case where expanded raster image data in the PDL controller 11 is color multivalued image data and a case where the expanded image data is black-and-white binary image data. Hereinafter, the process will be explained in detail with reference to the flow chart shown in FIG. 8.

First, the PDL controller 11 receives a PDL job from a host computer and analyzes the received PDL data (S801). Then, the PDL controller 11 extracts the portion concerning job operation designation such as job mode designation (e.g., two-faced print, finishing, etc.), sheet size and medium designation of each page, and the like, and generates a command sequence of this print job.

Next, the PDL controller 11 discriminates a type (i.e., color or black-and-white) of the image in this job (S802).

If the discriminated type of the image is the color image, the PDL image description portion is analyzed, and eight-bit color multivalued raster data of each of Y, M, C and K is generated on a frame buffer (S803).

Then, a process to queue the raster image data in the transmission image buffer memory is performed (S804). As well as the first embodiment, the raster data is correlated with a label, subjected to a JPEG compression process, and then stored in a hard disk. As a result, the label is queued.

After the image data expansion ended, the command sequence is transmitted (S805). Subsequently, the image processing controller 10 which received the command sequence starts preparing the image reception and then notifies the PDL controller 11 of the end of the preparation for the image reception.

After then, Y, M, C and K raster image data are simultaneously transferred respectively to video signal lines of Y, M, C and K of a video interface (S806). More specifically, the Y raster image data is transferred to the Y video signal line, the M raster image data is transferred to the M video signal line, the C raster image data is transferred to the C video signal line, and the K raster image data is transferred to the K video signal line. Then, it is discriminated whether or not the transfer of the Y, M, C and K raster image data for one page ends (S807). If it is discriminated that the transfer does not end, the flow returns to the step S806 to transfer next Y, M, C and K raster image data. Such a process is repeated until the transfer of the Y, M, C and K raster image data for one page ends.

When the raster image data are transferred, timing commands indicating start timing and end timing of each page are transferred by a print port separately.

Moreover, as well as the first embodiment, it is also possible to prepare another port for transmitting the commands indicating the start timing and the end timing of the image data transfer, transmit the command sequence to the image processing controller 10 immediately after the command sequence was generated in the step S801, and then transmit the video data for each page to the image processing controller 10 as generating the raster image data.

Incidentally, if the type of the image discriminated in the step S802 is the black-and-white job (image), then raster data is generated (S808). In this case, for example, if a user designates black-and-white output in regard to the original color multivalued image data, the generated image data is the black-and-white multivalued image data.

If the generated raster image data is the black-and-white multivalued image data, the generated data is subjected to a binarization process (S809). The binarization process in this case is the same as that in the first embodiment. Subsequently, after the image data expansion ended, the command sequence is transmitted (S810). Then, the image processing controller 10 which received the command sequence starts preparing the image reception and then notifies the PDL controller 11 of the end of the preparation for the image reception.

After then, the K raster image data for four lines are simultaneously transferred to the video signal lines of Y, M, C and K of the video interface so that the image data of the first line is transferred to the signal line of Y, the image data of the second line is transferred to the signal line of M, the image data of the third line is transferred to the signal line of C, and the image data of the fourth line is transferred to the signal line of K (S811). Subsequently, it is discriminated whether or not the transfer of the K raster image data for one page ends (S812). If it is discriminated that the transfer does not end, the flow returns to the step S811 to simultaneously transfer the K raster image data for next four lines. Such a process is repeated until the transfer of the K raster image data for one page ends.

Here, it should be noted that the flow chart of FIG. 8 merely shows an example. That is, according to the PDL structure, the color/black-and-white discrimination can be of course performed after the image expansion ended.

In the process of the color multivalued image data, the PDL controller 11 can immediately start analyzing next PDL data by storing in the queue all the raster images of the job in question and entrusting the image transmission to another program operating in parallel. However, if the next PDL job data is again the color multivalued image data, the end of the job transfer is eventually influenced by the end of the video data transfer.

According to the present embodiment, in the case where the print engine equipped with the four image bearing bodies is used, the four video data signal lines are always used when only the K image data is transferred, whereby a video data transfer time can be shortened, and the PDL controller can immediately start analyzing the next PDL job.

Besides, in the explanation of the present embodiment, the color image job is separated from the black-and-white image job. However, the present embodiment is of course applicable to a case where color and black-and-white images mixedly exist in one page. In this case, the path through which the image data are transferred may be changed in regard to each page.

As explained above, according to the present embodiment, since a load on the image data transfer process by the image processing controller is reduced, the print job being in a waiting state in the image processing controller can be performed, and the operation of the image processing controller can be made efficient.

Moreover, since it is unnecessary to design the dedicated video interfaces in regard to the number of transfer bodies of the image formation unit, the identical video interface between the image generation controller unit and the image processing controller unit can be shared for the plural kinds of data.

What is claimed is:

1. A data transfer method in an image formation system which is equipped with an image generation controller unit for generating bitmap image data of an image, an image formation unit for forming an image on a recording medium, an image processing controller unit for controlling the image formation unit and for transferring image data at a timing requested by the image formation unit, and respective data signal lines for yellow, magenta, cyan and black to be used to transfer the image data between the image generation controller unit and the image processing controller unit, wherein in a case where the number of image bearing bodies of the image formation unit is one, when a color image signal is transferred from the image generation controller unit to the image processing controller unit, the image signals of one color component for the four lines are simultaneously transferred by using the yellow, magenta, cyan and black signal lines repeatedly until the transfer of the image signals for one page ends, and then the image signals of the next color component are transferred, when a tag signal is added to a pixel of the color image signal, neighboring pairs of pixels are handled as a set of pixels to reduce the resolution, whereby the image formation can be performed with an increased gradation, wherein the tag signal represents a photograph image area, and when a black-and-white image signal is transferred from the image generation controller unit to the image processing controller unit, the image signals of black color component are simultaneously transferred by using the yellow, magenta, cyan and black signal lines, wherein the black-and-white image signal is a binary signal and has a higher resolution than the color image signal.

2. A data transfer method in an image formation system which is equipped with an image generation controller unit for generating bitmap image data of an image, an image formation unit for forming an image on a recording medium, an image processing controller unit for controlling the image formation unit and for transferring image data at a timing requested by the image formation unit, and respective data signal lines for yellow, magenta, cyan and black to be used to transfer the image data between the image generation controller unit and the image processing controller unit, wherein in a case where the number of the image bearing bodies of the image formation unit is four, when a color image signal is transferred from the image generation controller unit to the image processing controller unit, the image signals of the respective color components for the corresponding one line are simultaneously transferred respectively by using the yellow, magenta, cyan and black signal lines, when a tag signal is added to a pixel of the color image signal, neighboring pairs of pixels are handled as a set of pixels to reduce the resolution, whereby the image formation can be performed with an increased gradation, wherein the tag signal represents a photograph image area, and when a black-and-white image signal is transferred from the image generation controller unit to the image processing controller unit, the image signals of black color component are simultaneously transferred by using the yellow, magenta, cyan and black signal lines, wherein the black-and-white image signal is a binary signal and has a higher resolution than the color image signal.

3. An image formation system comprising:

an image generation controller unit for generating bitmap image data of an image;

an image formation unit for forming an image on a recording medium;

an image processing controller unit for controlling the image formation unit and for transferring image data at a timing requested by the image formation unit; and respective data signal lines for yellow, magenta, cyan and black to be used to transfer the image data between the image generation controller unit and the image processing controller unit, wherein in a case where the number of image bearing bodies of the image formation unit is one, when a color image signal is transferred from the image generation controller unit to the image processing controller unit, the image signals of one color component for the four lines are simultaneously transferred by using the yellow, magenta, cyan and black signal lines repeatedly until the transfer of the image signals for one page ends, and then the image signals of the next color component are transferred, when a tag signal is added to a pixel of the color image signal, neighboring pairs of pixels are handled as a set of pixels to reduce the resolution, whereby the image formation can be performed with an increased gradation, wherein the tag signal represents a photograph image area, and when a black-and-white image signal is transferred from the image generation controller unit to the image processing controller unit, the image signals of black color component are simultaneously transferred by using the yellow, magenta, cyan and black signal lines, wherein the black-and-white image signal is a binary signal and has a higher resolution than the color image signal.

4. An image formation system comprising:

an image generation controller unit for generating bitmap image data of an image;

an image formation unit for forming an image on a recording medium;

an image processing controller unit for controlling the image formation unit and for transferring image data at a timing requested by the image formation unit; and respective data signal lines for yellow, magenta, cyan and black to be used to transfer the image data between the image generation controller unit and the image processing controller unit, wherein in a case where the number of the image bearing bodies of the image formation unit is four, when a color image signal is transferred from the image generation controller unit to the image processing controller unit, the image signals of the respective color components for the corresponding one line are simultaneously transferred respectively by using the yellow, magenta, cyan and black signal lines, when a tag signal is added to a pixel of the color image signal, neighboring pairs of pixels are handled as a set of pixels to reduce the resolution, whereby the image formation can be performed with an increased gradation, wherein the tag signal represents a photograph image area, and when a black-and-white image signal is transferred from the image generation controller unit to the image processing controller unit, the image signals of black color component are simultaneously transferred by using the yellow, magenta, cyan and black signals lines, wherein the black-and-white image signal is a binary signal and has a higher resolution than the color image signal.

\* \* \* \* \*